UNITED STATES PATENT OFFICE.

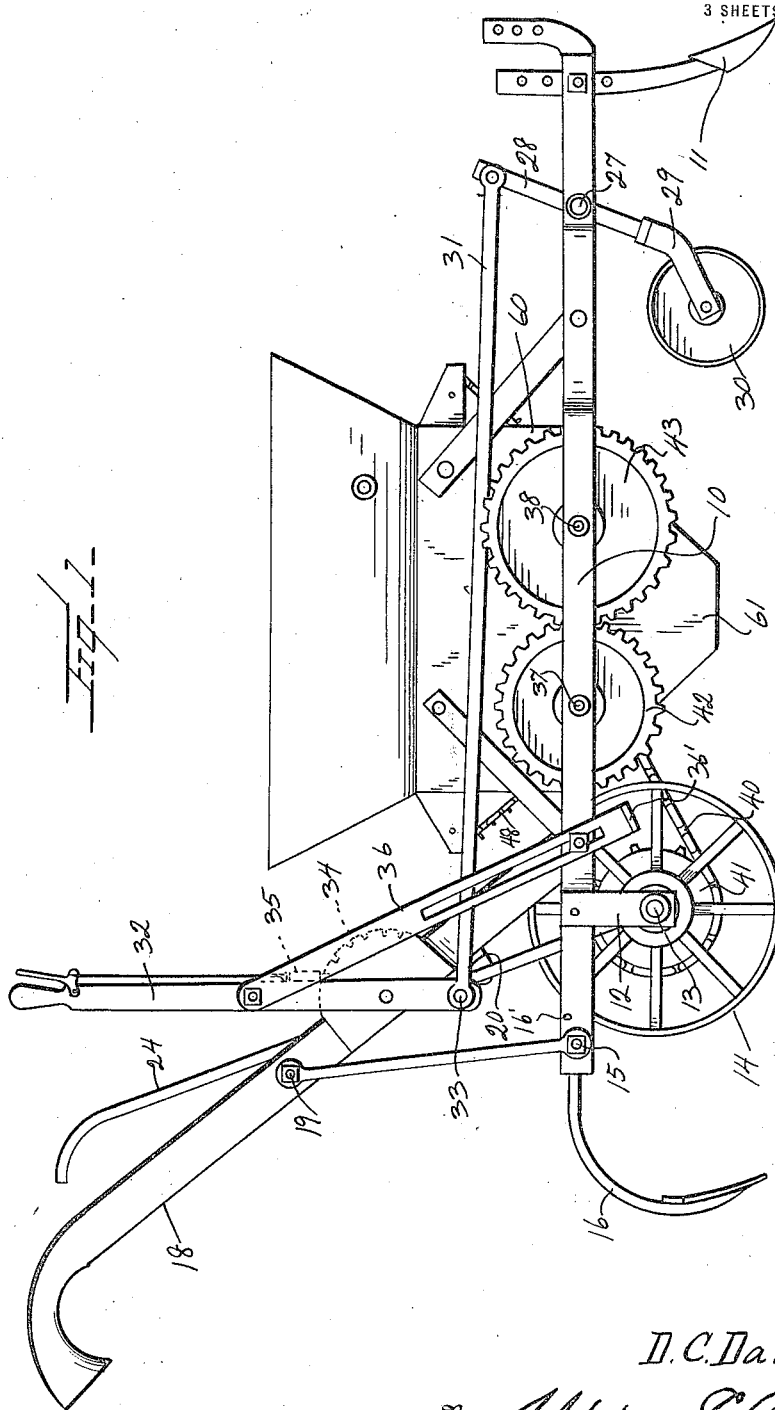

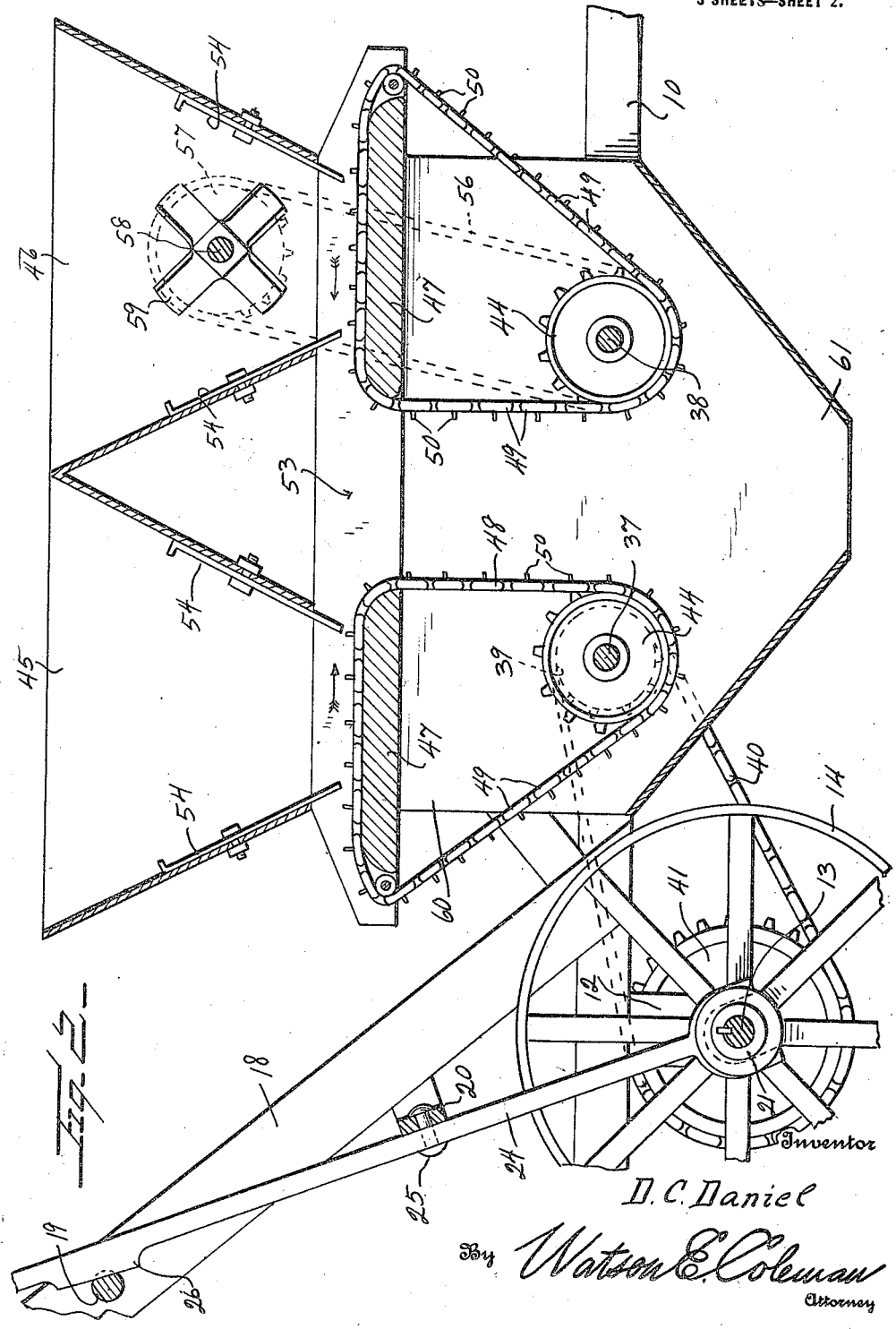

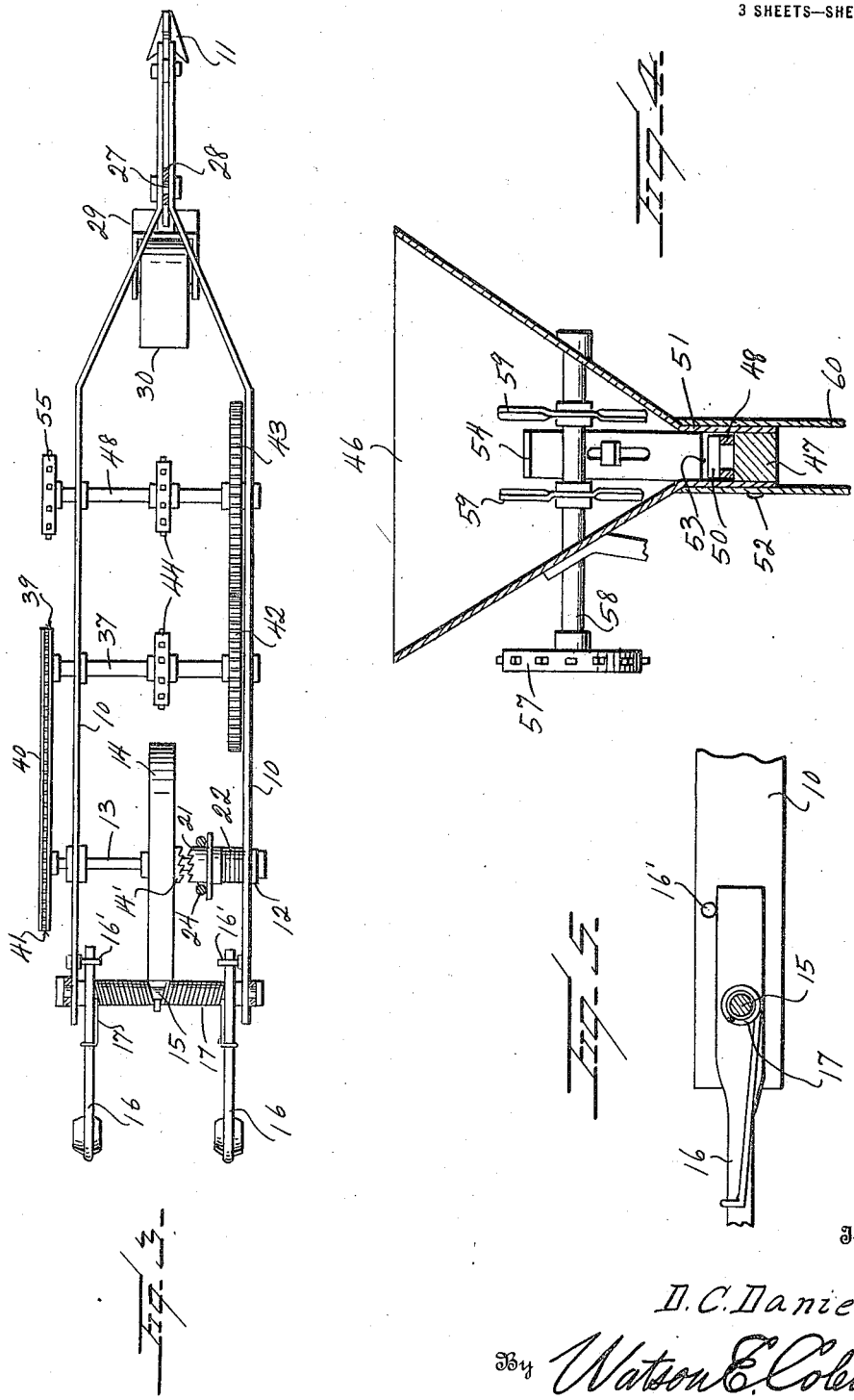

DAVID C. DANIEL, OF APEX, NORTH CAROLINA, ASSIGNOR OF ONE-HALF TO SYLVESTER BROWN SHEPHERD, OF RALEIGH, NORTH CAROLINA.

FERTILIZER DISTRIBUTER.

1,423,649. Specification of Letters Patent. Patented July 25, 1922.

Application filed June 26, 1920. Serial No. 392,028.

*To all whom it may concern:*

Be it known that I, DAVID C. DANIEL, a citizen of the United States, residing at Apex, in the county of Wake and State of North Carolina, have invented certain new and useful Improvements in Fertilizer Distributers, of which the following is a specification, reference being had to the accompanying drawings.

This invention relates to improvements in an apparatus for distributing fertilizer and the like, and more particularly to an apparatus whereby two distinct fertilizers may be simultaneously distributed in predetermined proportions.

An important object of the invention is to provide means for simultaneously withdrawing from two or more hoppers the contents thereof in predetermined quantities and discharging the withdrawn contents into yet a third hopper for distribution.

A further object of the invention is to provide a device of the above mentioned character which may be readily manipulated and controlled.

Other objects of the invention will become apparent throughout the course of the following description.

In the accompanying drawings wherein for the purpose of illustration is shown a preferred embodiment of my invention and wherein like reference characters designate like parts throughout:

Figure 1 is a side elevation of my device.

Figure 2 is a longitudinal sectional view taken therethrough.

Figure 3 is a plan view thereof, the superstructure being removed for the purpose of illustration.

Figure 4 is a transverse sectional view taken through one of the hoppers, and

Figure 5 is a detail view showing the mounting of the furrow closing shares.

In the construction of my apparatus I employ a frame embodying side frame sections 10 which are parallel rearwardly of the device and having their forward ends converging and joined together at the forward end of the device. Intermediate the forward ends of the converging portions is adjustably mounted a furrow forming share 11, preferably of that type which is supplied with mold boards throwing the dirt from the furrow on both sides thereof.

Adjacent the rear end of the framework 10 and depending from the side frames thereof are brackets 12 in which is rotatably mounted a shaft 13. A land wheel 14, rotatably mounted upon the shaft 13, contacts the surface of the ground, forming a support for the rear end of the frame work 10, and, as will hereinafter appear, a drive for the mechanism carried thereby.

A shaft 15 is secured to the rear ends of the side members of the frame and extend transversely of the frame and has pivotally mounted thereon furrow closing shares 16. A spring 17 is coiled about the shaft 15 and engages the share 16 forcing the same downwardly for engagement with the dirt thrown on opposite sides of the furrow by the share 11. These shares as previously stated are adapted to close the furrow. The downward movement of the shares is limited by means of suitable stops 16' extending inwardly from the side frame of the body frame and engaging the inner ends of the shares 16. The springs 17 permit yielding of the shares 16 in the event of their coming into contact with too solid a substance.

Guide handles 18 are secured to the frame 10 rearwardly and extend upwardly at an angle therefrom and are held in spaced relation by spacing members 19 and 20. The land wheel 14 embodies the female member 14' of a clutch. Slidably mounted upon the shaft 13 and held against rotation with relation thereto is the male member 21 of the clutch, normally forced into engagement with the female member 14' by means of a coil spring 22 or the like. The male member 21 of the clutch is grooved to receive the forked lower end of the lever 24, which is pivoted intermediate its ends, as at 25, to the lower spacing member 20 of the handles 18. This lever extends upwardly and engages slidably against the forward face of the upper spacing member 19 and is provided with a tooth 26 adapted to engage the corresponding notch formed in the spacing member 19. This notch is so positioned that when the tooth of the lever 24 is engaged therein the male member 21 of the clutch is disengaged from the female member 14' thereof. It will be seen that when the sections of the clutch are in engaged position the shaft 13 is driven by rotation of the land wheel 14.

A support 27 extends intermediate the side frames of the frame 10 immediately rearward of the share 11 and has pivotally mounted thereon a lever 28 provided at its lower end with a bracket 29 in which is rotatably mounted a supporting wheel 20. The upper end of the lever 28 is pivotally connected to the rearwardly extending link 31 which is in turn pivoted to one end of the lever 32 as at 33. The lever 32 is pivotally mounted intermediate its ends and is provided with a latch segment 34 and latch 35 by means of which the lever may be adjustably positioned. It will be seen that by moving the lever 32 the supporting roller 30 may be moved into or out of engagement with the ground and that when the wheel 30 is fully engaged the share 11 is withdrawn from engagement with the ground. It will likewise be seen that the depth with which the share 11 engages the ground may be regulated by adjustably positioning the roller 30. The lever 32 has likewise pivotally connected thereto, and downwardly extending therefrom, a member 36 which terminates in an out turned foot 36'. This foot is adapted, when the lever 32 is fully depressed, to engage the ground and to support the frame 10 to prevent the same from toppling when not in use.

Rotatably mounted in the frame sections 10 centrally thereof and arranged in spaced relation are transverse shafts 37 and 38. The shaft 37, or rearward shaft, has one end projecting beyond the frame 10 and is provided with a sprocket wheel 39 which is connected by means of a chain 40 with a sprocket wheel 41 mounted upon the outer end of the shaft 13. It will be seen that when the shaft 13 is rotated the shaft 37 is likewise rotated. The shaft 37 is provided with a gear 42 which meshes with the gear 43 mounted upon the shaft 38. By inspection of the drawings, it will be seen that these shafts are so driven that they rotate toward one another when viewed in plan.

Each of the shafts 37 and 38 is provided intermediate the side frames of the frame 10 with a sprocket wheel 44. Mounted above the shafts 37 and 38 are hoppers 45 and 46 respectively, these hoppers tapering downwardly to suitable outlets. Arranged immediately below these outlets are conveyor guides 47 about which are mounted conveyor chains 48, which engage the sprocket wheels 44 of the shafts 37 and 38, each conveyor chain engaging its respective sprocket wheel. An inspection of the drawings will reveal the fact that the upper runs of these two conveyor chains move toward one another and consequently discharge their contents toward a point lying therebetween. Each conveyor chain is made up of links 49 provided with an upstanding flange 50.

The height of these flanges, as will hereinafter appear, will govern the amount of material removed from the hoppers 45 and 46 by each link of the conveyor chain. These conveyor chains are preferably made readily interchangeable in order that the quantities removed from the hoppers may be readily varied. The side walls of the hoppers 45 and 46 at their lower ends terminate in parallel portions 51 which are secured to the sides of the conveyor chain guides 47 as at 52, forming therebetween a channel 53 through which the chains pass. Slidably and adjustably mounted upon the front and rear walls of the hoppers are adjustable slides 54 which may be adjusted vertically upon the walls of the hopper so that they just clear the tops of the flanges 50 of the links 49 of the conveyor chain, thus preventing excess material being piled on top of the material carried between each pair of flanges and limiting the contents thereof to the amount which they are designed to deliver.

The outer end of the shaft 38 is provided with a sprocket wheel 55 which is connected by the chain 56 with a sprocket wheel 57 mounted upon the shaft 58 extending transversely of the forward hopper 46. This shaft is provided interiorly of the hopper with agitator arms 59 by means of which the contents of the hopper are kept from packing. If desired, the hopper 45 may be likewise provided with an agitator similar to the hopper 46.

Between the hoppers 45 and 46 is arranged a third hopper 60 which receives the material delivered by the chains 48. This hopper is provided with a downwardly projecting mouth 61 which discharges the contents of the hopper into the furrow formed by the share 11. It will be seen that as the hopper 60 is arranged intermediate the share 11 and the share 16, and as the land wheel 14 which follows in the path of the share 11 is arranged intermediate the discharge of said hopper and the share 16, that the contents of the hopper 60 will be discharged into the furrow subsequently pressed by the land wheel 14, and closed by the furrow closure 16.

As many obvious changes in the shape, size and arrangement of the various parts herein shown may be made without in any manner departing from the spirit of my invention, I do not limit myself to the specific construction hereinbefore set forth, but may make any such changes without departing from the spirit of the invention or the scope of the subjoined claim.

Having now described my invention, what I claim is:

A fertilizer distributer comprising a portable frame, alined hoppers supported therein, said hoppers having common sides formed with parallel lower ends forming a common guide channel, guide members spaced apart longitudinally in said channel and transversely filling the same, a guide roller at the outer end of each guide member, conveyor chains operating over the guide members and rollers, a discharge chute common to both hoppers and having its discharge opening vertically aligned with the space intermediate the adjacent ends of said guide members, spaced shafts journaled in the frame and extending across the chute, gears connecting the shafts, sprockets on said shafts engaged with the chains and means for driving one of said shafts, said conveyor chains operating in opposite directions whereby the fertilizer from the hoppers is mixed before being discharged from the chute.

In testimony whereof I hereunto affix my signature.

DAVID C. DANIEL.